United States Patent
Wang (10) Patent No.: US 11,189,918 B2
(45) Date of Patent: Nov. 30, 2021

(54) MULTI-BEAM PHASED-ARRAY ANTENNA WITH REDUNDANCY

(71) Applicant: Tubis Technology Inc., Pasadena, CA (US)

(72) Inventor: James Wang, Pasadena, CA (US)

(73) Assignee: Tubis Technology Inc., San Diego, CA (US)

( * ) Notice: Subject to any disclaimer, the term of this patent is extended or adjusted under 35 U.S.C. 154(b) by 0 days.

(21) Appl. No.: 16/850,947

(22) Filed: Apr. 16, 2020

(65) Prior Publication Data

US 2020/0335866 A1 Oct. 22, 2020

Related U.S. Application Data (60) Provisional application No. 62/835,604, filed on Apr. 18, 2019.

(51) Int. Cl.
| | |
|---|---|
| *H01Q 3/26* | (2006.01) |
| *H01Q 21/00* | (2006.01) |
| *H01Q 3/28* | (2006.01) |
| *H01Q 25/04* | (2006.01) |
| *H04B 7/06* | (2006.01) |
| *H01Q 3/34* | (2006.01) |

(52) U.S. Cl.
CPC ............ *H01Q 3/2617* (2013.01); *H01Q 3/28* (2013.01); *H01Q 3/34* (2013.01); *H01Q 25/04* (2013.01); *H04B 7/0617* (2013.01)

(58) Field of Classification Search
CPC ........ H01Q 25/04; H01Q 3/26; H01Q 3/2617; H01Q 3/00; H01Q 3/28; H01Q 3/24; H01Q 3/34; H01Q 1/24; H01Q 1/241; H01Q 1/38; H01Q 21/00; H01Q 21/0025; H01Q 21/0037; H01Q 21/0075; H01Q 21/06; H01Q 21/061; H01Q 25/00; H01Q 3/36; H04B 7/06; H04B 7/0617

See application file for complete search history.

(56) References Cited

U.S. PATENT DOCUMENTS

| | | | | |
|---|---|---|---|---|
| 5,162,803 | A | * 11/1992 | Chen ........................ | H01Q 3/22 342/372 |
| 5,293,171 | A | * 3/1994 | Cherrette ............... | H01Q 1/002 343/700 MS |

(Continued)

*Primary Examiner* — Tho G Phan
(74) *Attorney, Agent, or Firm* — Imperium Patent Works; Zheng Jin (57) ABSTRACT

A low-cost implementation and a simplified digital signal control and synchronization for a multi-beam phased-array antenna is proposed. In a preferred embodiment, the multi-beam phased array antenna is implemented with a stack-up comprises 1) an antenna substrate aperture containing embedded antenna elements and a third layer of the signal combiner/divider and distribution network, 2) interposer substrate providing a second layer of the signal combiner/divider and distribution network and the carrier of BPU ICs, and 3) the BPU ICs containing the plurality of phased-array frontend processing unit and a first layer of the signal combiner/divider and distribution unit. In one advantageous aspect, the invention is to combine the third layer of the signal combiner/divider and distribution network with the antenna onto the same substrate, eliminating the use of expensive miniature high frequency connectors.

20 Claims, 10 Drawing Sheets

(56) References Cited

U.S. PATENT DOCUMENTS

| | | | |
|---|---|---|---|
| 7,423,607 B2* | 9/2008 | Mohamadi | H01L 23/66 |
| | | | 342/371 |
| 9,742,075 B2* | 8/2017 | Woollen | H01Q 3/34 |
| 10,218,069 B2* | 2/2019 | Gomadam | H01Q 3/34 |
| 10,367,256 B2* | 7/2019 | Edenfield | H01Q 3/34 |
| 10,944,180 B2* | 3/2021 | Vigano | H01Q 3/2658 |

* cited by examiner

TOP VIEW

MULTI-BEAM PHASED-ARRAY ANTENNA WITH REDUNDANCY

CROSS REFERENCE TO RELATED APPLICATIONS

This application claims priority under 35 U.S.C. § 119 from U.S. Provisional Application No. 62/835,604, entitled "Multi-Beam Phased-Array Antenna for Radiation Environment," filed on Apr. 18, 2019, the subject matter of which is incorporated herein by reference.

TECHNICAL FIELD

The disclosed embodiments relate generally to phased array antenna, and, more particularly, to multi-beam phased-array antenna in wireless communications systems.

BACKGROUND

The bandwidth shortage increasingly experienced by mobile carriers has motivated the exploration of the underutilized Millimeter Wave (mmWave) frequency spectrum around 20 G to 300 G Hz for the next generation broadband cellular communication networks. The available spectrum of the mmWave band is hundreds of times greater than the conventional cellular system. The satellite market for broadband communications has been transitioning from Ku-band to Ka-band frequency in search of more bandwidth and lower cost per bit of service. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions. The advance in the lower earth orbit (LEO) satellite in recent years also drive the needs for electrically steerable array antenna due to the requirements track and maintain the communication link when LEO satellites are moving in the non-geostationary orbits. Due to limited space available on-board satellites, multi-beam steerable array antenna (multiple beams sharing the same antenna aperture) reduces the size, weight, footprint requirements and allows the satellite to maintain a provide services to multiple ground terminals.

In antenna theory, a phased antenna array usually means an array of antennas that creates a beam of radio waves can be electronically steered to point in different directions, without moving the antennas. In the phased antenna array, the radio frequency current from the transmitter is fed to the individual antennas with the correct phase relationship so that the radio waves from the separate antennas add together to increase the radiation in a desired direction, while cancelling to suppress radiation in undesired directions. In the phased antenna array, the power from the transmitter is fed to the antennas through phase shifters, controlled by a processor, which can alter the phase electronically, thus steering the beam of radio waves to a different direction.

The architecture of a multi-beam phased-array antenna includes a single set of antenna elements, connected to multiple sets of beamformer consisting of phased-array frontend processing units, a control and synchronization bus, and a signal distribution network. All frontend functions are controlled via digital register and memory. For microwave and mmWave phased-array antenna, the antenna elements are placed close to each other (i.e., equal to or less than half a wavelength). Therefore, there is little room available in practical implementation for the signal and control interconnection to support the beamformer(s).

The traditional phased array antenna structure consists of an antenna aperture plate, transceiver modules, and signal combiner/divider and distribution network. The antenna aperture plate is a support structure containing the passive antenna elements in the phased-array antenna. The transceiver modules, attached to antenna elements, provides the low noise amplification to maintain receive sensitivity and/ or the power amplification for the required transmit signal power level. The signal combiner/divider and distribution network, combines the received signals from multiple antenna elements and/or divides the transmit signal for multiple antenna elements. The transceiver modules are connected to the antenna elements in the aperture plate and the signal combining and dividing network typically via connectors. For the mmWave phased-array antenna, miniature high frequency connectors are needed due to close spacing of the antenna elements. Additionally, the transceiver modules need to be miniaturized and individually shielded to avoid mutual coupling. The signal combining network and dividing network is connected to transceiver modules via miniature connectors and requires very complicated interconnection in order to realize the array manifold. Such traditional implementation provides high performance at the expense of high cost and complicated manufacturing and assembly. In additional to the array manifold for the signal interconnection, it is desirable to have a serial bus implementation for the control and synchronization bus. For any high-speed digital interconnection, long interconnection wiring/traces require (active) buffers to maintain signal integration and bus speed. It is desirable to keep interconnection as short as possible. It is also desirable to keep the number of signals in interconnection serial bus as little as possible. However, antenna feeds are position in regular grids in an antenna substrate. The conventional corporate distribution network employing Wilkinson combiner will not work.

A low-cost implementation and a simplified digital signal control and synchronization for a multi-beam phased-array antenna is desired.

SUMMARY

A low-cost implementation and a simplified digital signal control and synchronization for a multi-beam phased-array antenna is proposed. In a preferred embodiment, the multi-beam phased array antenna is implemented with a stack-up comprises 1) an antenna substrate aperture containing embedded antenna elements and a third layer of a signal combiner/divider and distribution network, 2) interposer substrate providing a second layer of the signal combiner/ divider and distribution network and the carrier of beamforming processing unit (BPU) integrated circuits (ICs), and 3) the BPU ICs containing the plurality of phased-array frontend processing unit and a first layer of the signal combiner/divider and distribution network. In one advantageous aspect, the invention is to combine the third layer of the signal combiner/divider and distribution network with the embedding antenna onto the same substrate, eliminating the needs for expensive miniature high frequency connectors. In one example, signals at the BPU ICs are converted wit LO signal to allow the signal combiner/divider and distribution network to operate at different frequency for good isolation and reduced coupling. Another advantageous aspect is that redundant digital circuit are included to prevent and recover from erroneous events due to external disturbances.

In one embodiment, a multi-beam phased-array antenna transmits or receives antenna beam signals via a plurality of antenna elements embedded on an antenna substrate of a phased-array antenna. The antenna processes the antenna beam signals using a plurality of BPU integrated circuits (ICs) containing a plurality of phased-array frontend processing units coupled to the plurality of antenna elements. The antenna distributes multiple transmit signals or receive signals to the plurality of BPU ICs via three layers of a signal combiner/divider and distribution network, which are contained within the antenna substrate, a plurality of interposers, and the plurality of BPU ICs that are mounted on the plurality of interposers. The antenna also contains a control and synchronization system implemented with serial bus and with redundancy to withstand harsh operating environment.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
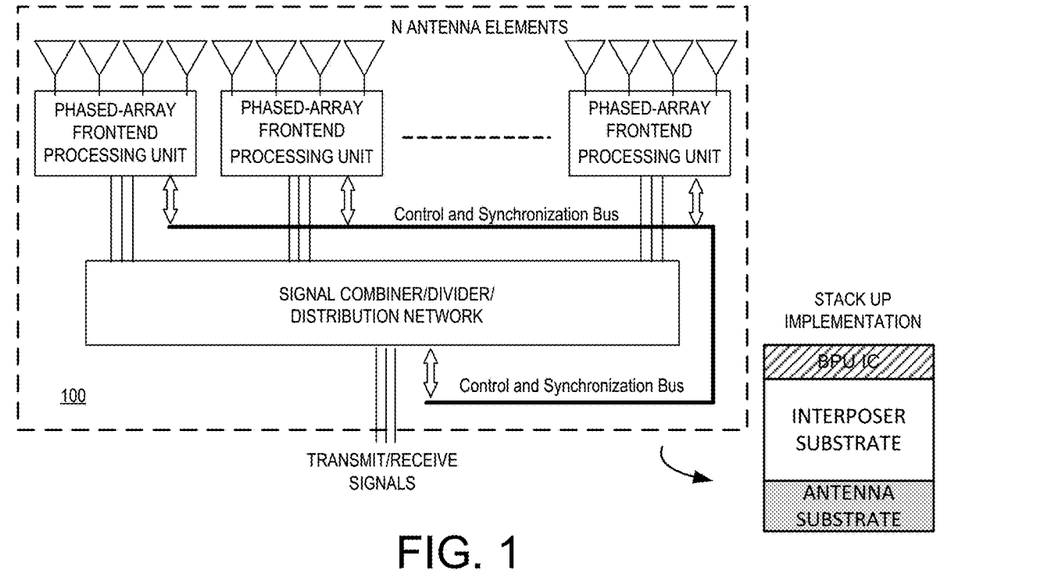
FIG. 1 illustrates a multi-beam phased-array antenna architecture for simultaneously transmitting or receiving multiple directional beams (signals) in accordance with a novel aspect.

FIG. 1 illustrates a multi-beam phased-array antenna architecture 100 for simultaneously transmitting or receiving multiple directional beams (signals) in accordance with a novel aspect. The multi-beam phased-array antenna provides directional communications with narrow beams and can support multi-gigabit data rate. One example of such multi-beam phased-array antenna is used in a Millimeter Wave (mmWave) cellular base station utilizing the mmWave frequency spectrum. Another example is a Ka-band spaceborne satellite antenna. In such mmWave cellular base station or satellite antenna, directional communications are achieved via beamforming, wherein a phased antenna array having multiple antenna elements are applied with multiple sets of beamforming weights (phase shift values) to form multiple beam patterns. As depicted, multi-beam phased-array antenna 100 comprises antenna elements, phased-array frontend processing units, a signal combiner/divider and distribution network, and a control and synchronization bus.

In antenna theory, a phased antenna array usually means an array of antennas that creates a beam of radio waves can be electronically steered to point in different directions, without moving the antennas. In the phased antenna array, the radio frequency current from the transmitter is fed to the individual antennas with the correct phase relationship so that the radio waves from the separate antennas add together to increase the radiation in a desired direction, while cancelling to suppress radiation in undesired directions. In the phased antenna array, the power from the transmitter is fed to the antennas through phase shifters, controlled by a processor, which can alter the phase electronically, thus steering the beam of radio waves to a different direction.

In the example of FIG. 1, multi-beam phased-array antenna 100 comprises N antenna elements for transmit and receive signals in different antenna beam directions within a desired field of view (FOV), a plurality of phased-array frontend processing units for processing the antenna beam signals, a control and synchronization bus, and a signal combiner/divider and distribution network for transmitting/receiving signals to/from backend signal processors. In a preferred embodiment, the multi-beam phased array antenna is implemented with a stack-up comprises 1) an antenna substrate aperture containing embedded antenna elements and a third layer of the signal combiner/divider and distribution network, 2) interposer substrate providing a second layer of the signal combiner/divider and distribution network, and the carrier of beamforming processing unit integrated circuits (BPU ICs), and 3) the BPU ICs containing the plurality of phased-array frontend processing unit, and a first layer of the signal combiner/divider and distribution network. One novel aspect of the proposed invention is that BPU can be assembled onto the interposer using the low-cost flip-chip assembly and the interposer can be assembled onto the antenna substrate using the printed circuit board assembly technique, thus, eliminating the miniature high frequency connectors.

In one advantageous aspect, the invention is to combine the third layer of the signal distribution network with the antenna onto the same substrate, eliminating another substrate for the signal combiner/divider and distribution network. In one example, signals at the BPU ICs are converted with local oscillator (LO) signal to allow the signal combiner/divider and distribution network to operate at different frequency for good isolation and reduced coupling without the needs for spieling structure. The proposed invention can substantially reduce the cost of the phased-array antenna without sacrificing the performance.

Figure 2:
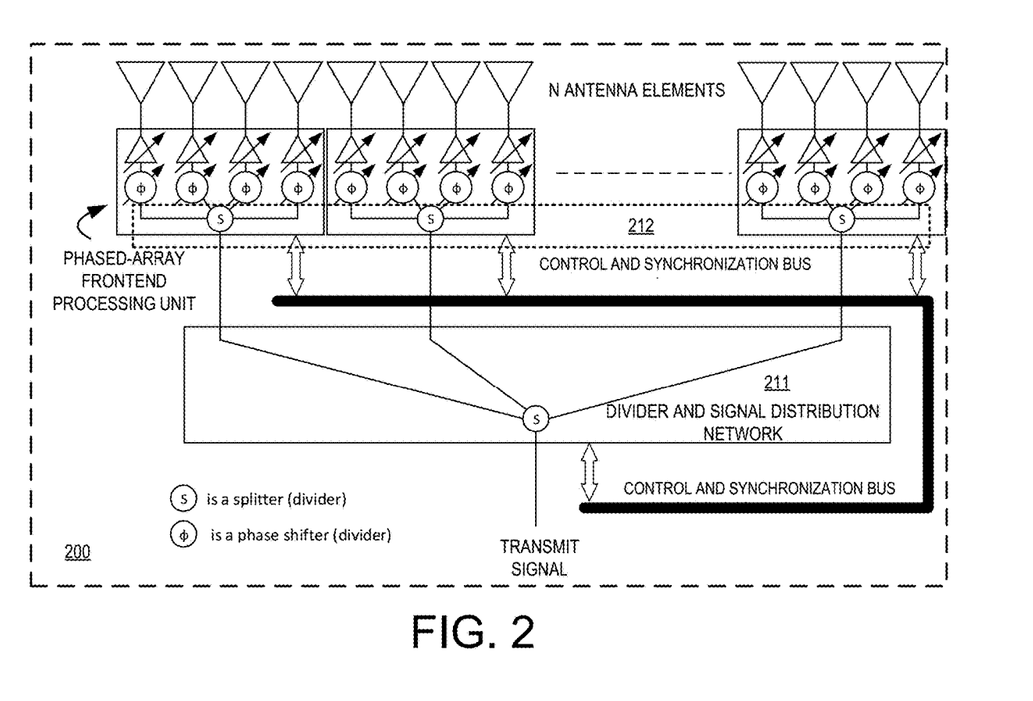
FIG. 2 is a functional diagram of a single beam transmit phased-array antenna that carry out embodiments of the present invention.

FIG. 2 is a functional diagram of a single beam transmit phased-array antenna 200 that carry out embodiments of the present invention. Transmit phased-array antenna 200 comprises a plurality of transmit antenna elements for transmitting antenna beam signals, a plurality of phased-array frontend processing units (comprising power amplifiers (PAs), phase shifters, and first layer of dividing network 212), a control and synchronization bus, and a signal distribution network (e.g., a divider and distribution network 211). The divider network 211 takes a transmit signal and divides it to a plurality of output signals. The phased-array frontend processing unit, further dividers to a plurality of output signals by the first layer of dividing network 212, transmitted through the phase shifters, through the PAs, and then transmitted out via the antenna elements.

Figure 3:
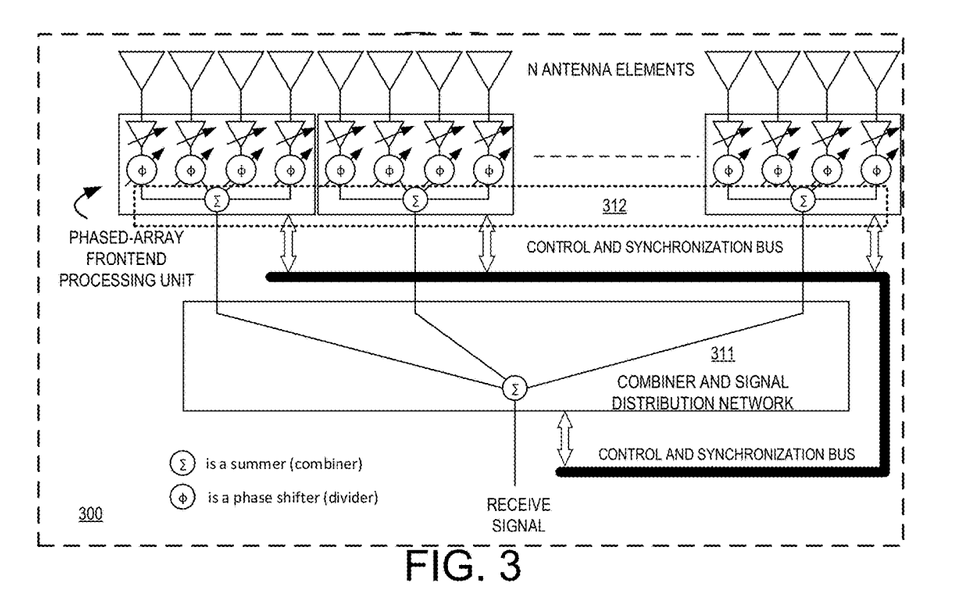
FIG. 3 is a functional diagram of a single beam receive phased-array antenna that carry out embodiments of the present invention.

FIG. 3 is a functional diagram of a single beam receive phased-array antenna 300 that carry out embodiments of the present invention. Receive phased-array antenna 300 comprises a plurality of receive antenna elements for receiving antenna beam signals, a plurality of phased-array frontend processing units (comprising low noise amplifiers (LNAs), phase shifters, and first layer of combing network 312), a control and synchronization bus, and a signal distribution network (e.g., a combiner and distribution network 311). Antenna beam signals are received through the antenna elements, through the LNAs, through the phase shifters, and then combined by the first layer combining network 312, and then by the combiner network 311 to a receive signal for processing.

Figure 4:
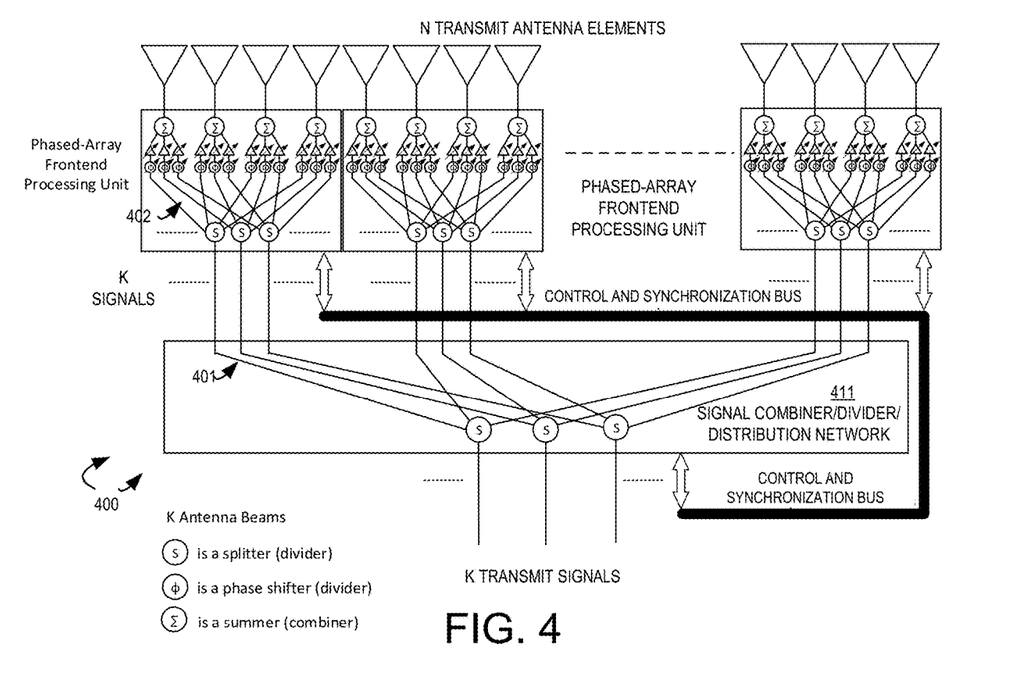
FIG. 4 illustrates a functional diagram of a multi-beam transmit phased antenna array and formation and control of multiple antenna beams.

FIG. 4 illustrates a functional diagram of a multi-beam transmit phased antenna array 400 and formation and control of multiple antenna beams. Transmit array 400 comprises N transmit antenna elements, a plurality of phased-array frontend processing units (comprising power amplifiers (PAs) and phase shifters), a control and synchronization bus, and a signal combiner/divider and distribution network 411. In the transmit direction, K transmit signals are to be transmitted by the N antenna elements using K different antenna beams. Each of the K input signals is split (divided) into N signals in 401 and 402 and undergoing the corresponding N phase shifters and power amplifiers before radiating out of the N antenna elements. N phase shifters are configured such that they are phase coherent in the desired beam direction. N variable gain amplifiers are configured to achieve the desired amplitude shaping (i.e., sidelobe adjustment) for the antenna beams. Together the N pairs of phase shift and amplitude shaping setting are called antenna weight vectors (AWVs) for a beam. A phase shifter and the corresponding amplifier is referred to as a variable amplitude and phase adjustment (VAP). K antenna AWVs are used to simultaneously from K antenna beams from the N antenna elements. Beam direction change in each of the K antenna beam is achieved by setting the corresponding AWV set. Similar formation and control of multiple antenna beams apply for a multi-beam receive phased-antenna array in the receive direction.

There are different considerations for the implementation of the above described multi-beam transmit and receive phased antenna array. First, can the N antenna elements be implemented on an antenna substrate? Second, how to include the combiners and splitters (dividers) in an integrated circuit (IC) with the phased-array frontend processing units, in the interposer substrate, and in the antenna substrate? Third, is it possible to remove all connectors, including the connectors used to interconnect the phased-array frontend processing units and the signal distribution network? Fourth, is it possible to share the same substrate between the signal combiner/divider and distribution network and the antenna elements, which can lead to significant cost reduction (no connector, easy to manufacture)? In one embodiment, a low-cost implementation with no connectors for the multi-beam phased array antenna is proposed. Further, the signal combiner/divider and distribution network can operate at a different frequency for good isolation and reduced coupling.

Figure 5:
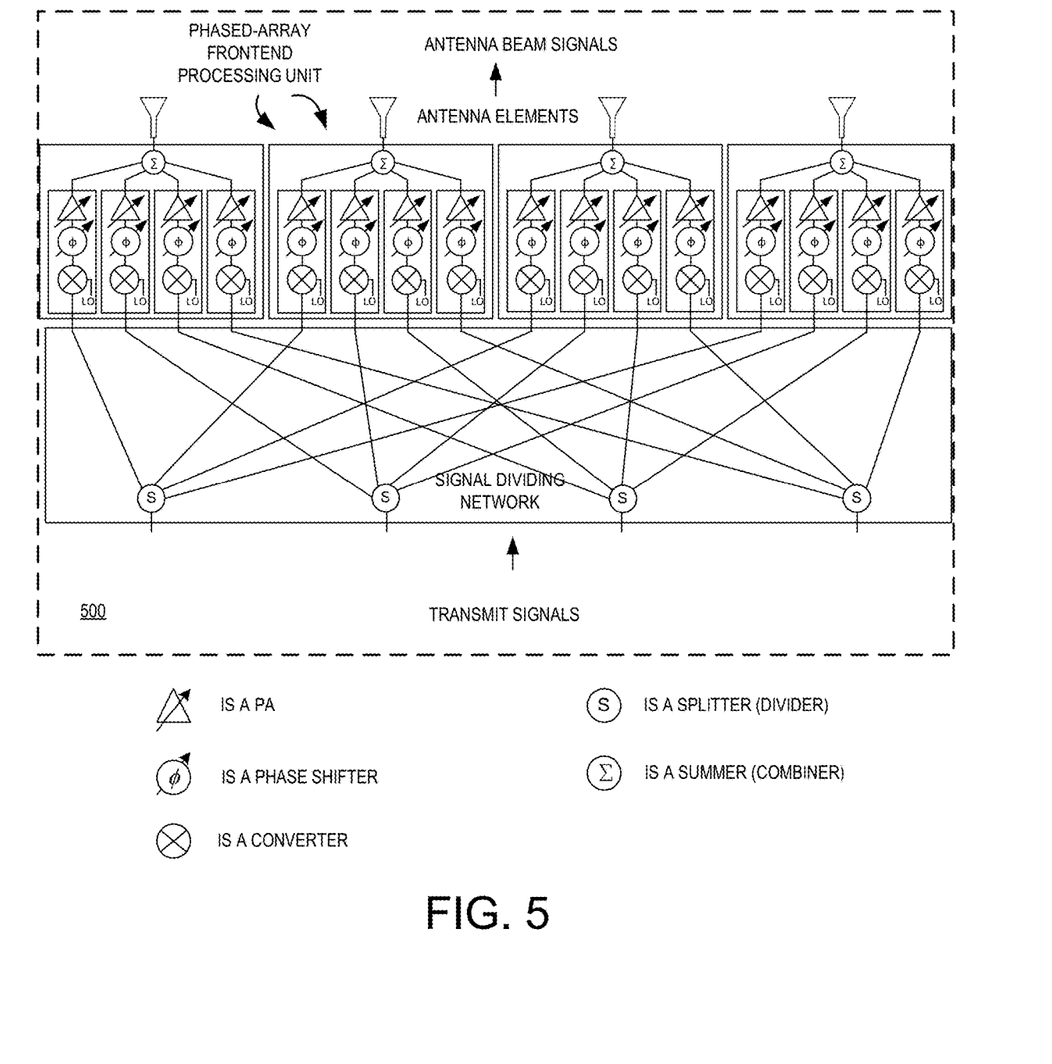
FIG. 5 illustrates one embodiment of a multi-beam transmit antenna array with reduced coupling in accordance with one novel aspect.

FIG. 5 illustrates one embodiment of a multi-beam transmit phased antenna array 500 with reduced coupling in accordance with one novel aspect. The multi-beam antenna array 500 comprises four antenna elements, a phased-array frontend processing unit (comprising power amplifiers (PAs), phase shifters, and up/down converters), and a signal dividing network. In the example of FIG. 5, four transmit signals are to be transmitted by the four antenna elements using four different antenna beams. Each of the four input signals is split (divided) into four signals and undergoing the corresponding four phase shifters and power amplifiers (VAP chains) before radiating out of the four antenna elements. To avoid signal coupling between the transmit antenna elements and the signal dividing network, the four transmit signals at different VAPs can be upconverted with a local oscillator (LO) signal (the same LO signal for all VAPs). The signal dividing network operates at different frequency from the RF frontend processing units to reduce coupling. In an alternate embodiment, the transmit signal can also be upconverted with a local oscillator (LO) signal before the first layer of dividing network.

Figure 6:
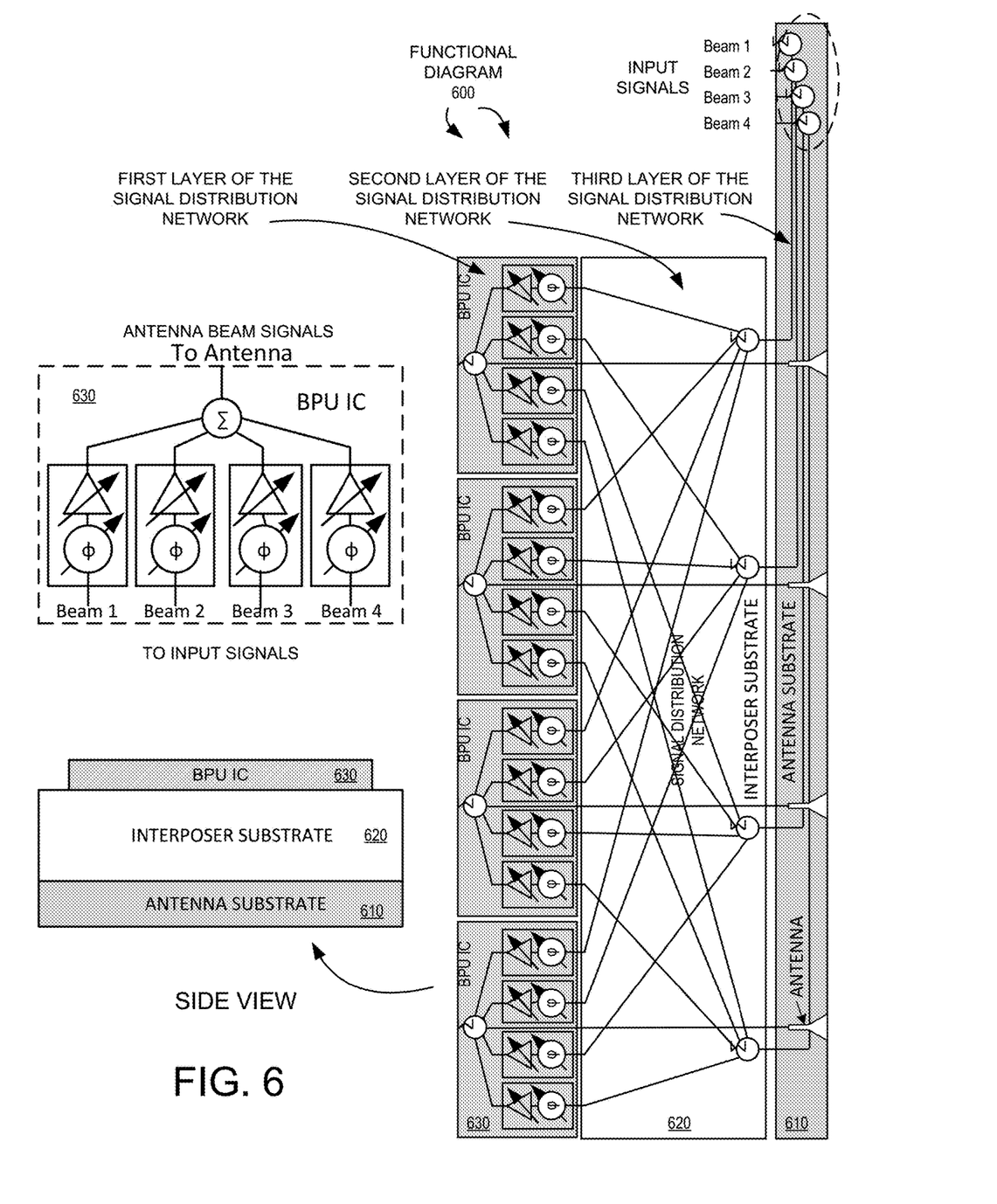
FIG. 6 illustrates a proposed embodiment of a multi-beam phased-array antenna formed by an antenna substrate, and interposer substrate, and BPU ICs containing phased-array frontend processing units.

FIG. 6 illustrates a proposed embodiment of a multi-beam transmit phased-array antenna 600 formed by an antenna substrate, and interposer substrate, and BPU ICs containing phased-array frontend processing units. As depicted by the functional diagram, multi-beam transmit phased-array antenna 600 comprises a plurality of antenna elements for transmit antenna beam signals in different antenna beam directions, a plurality of phased-array frontend processing units for processing the antenna beam signals, and a signal distribution network for distributing input (transmit) signals from a backend (baseband) processor. In a preferred embodiment, the multi-beam transmit phased array antenna 600 is implemented with a stack that comprises 1) an antenna substrate aperture 610 containing embedded antenna elements and a third layer of the signal divider and distribution network, 2) an interposer substrate 620 providing a second layer of the signal divider and distribution network and the carrier of BPU ICs 630, and 3) the BPU ICs 630 containing the plurality of phased-array frontend processing units and also containing a first layer of signal divider and distribution network.

As depicted by the sideview of the multi-beam phased-array antenna 600, the bottom of the stack is the antenna substrate aperture 610, the middle of the stack is the interposer substrate 620, and the top of the stack is the PBU ICs 630, which are mounted on the interposer 620. The antenna substrate 610 contains embedded antenna elements, and also provides the main (third layer) signal divider and distribution network, which interconnects the multiple input signals (transmit signals) with the plurality of the BPU ICs. The interposer 620 provides the second layer of the signal distribution network, which distributes the multiple transmit signals, e.g., input signals with Beam1, Beam2, Beam3, and Beam4, to the plurality of BPU ICs that are mounted on the interposer 620. As depicted by 630, each BPU IC comprises four VAPs (variable amplitude and phased adjustment chain), each VAP for a corresponding antenna beam signal. The first layer of signal divider and distribution network (not shown) can be included in the BPU when needed. Different input signals are summed and fed to a corresponding antenna for transmission as antenna beam signals. Multiple BPUs can be contained in a single BPU IC.

Figure 7:
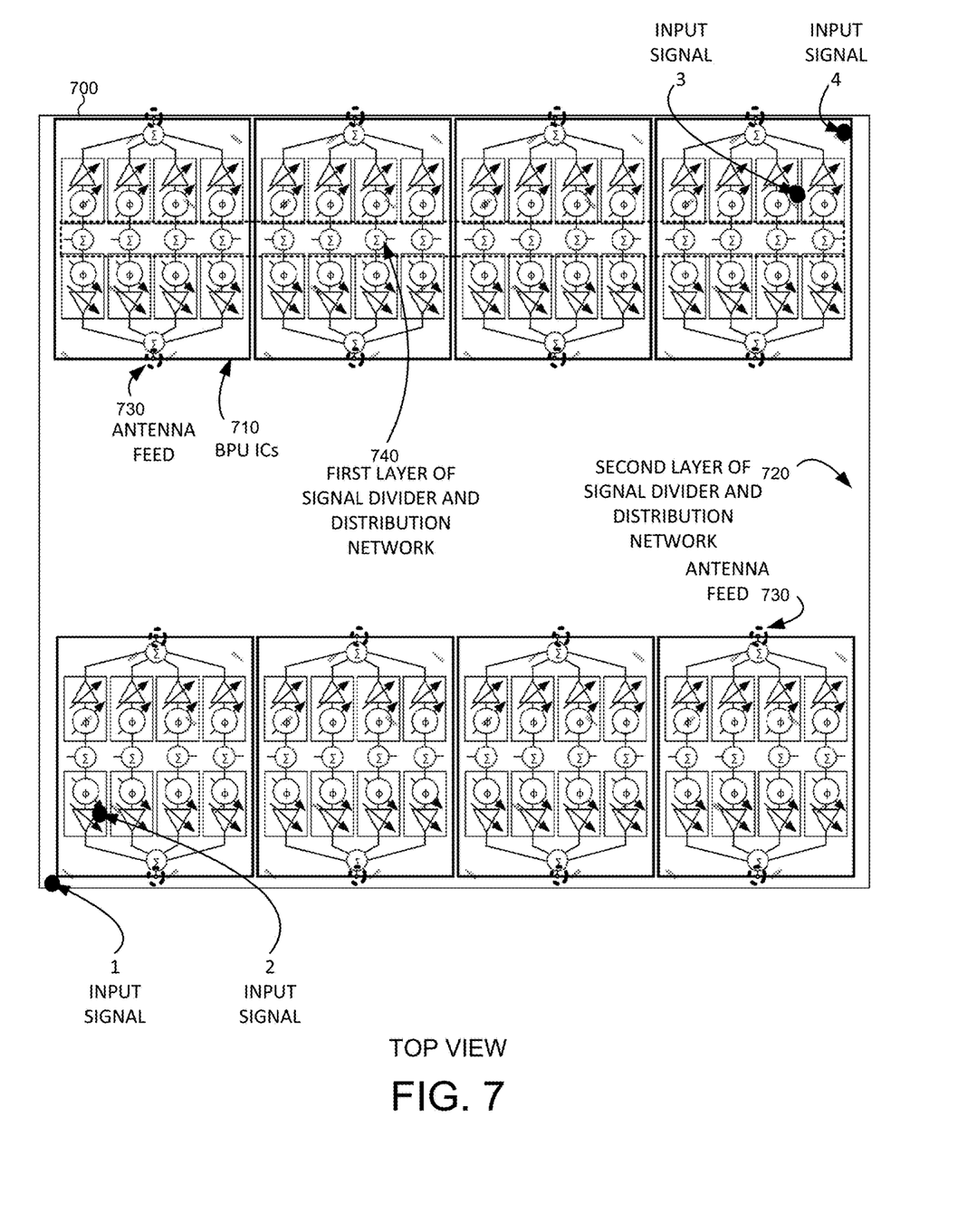
FIG. 7 illustrates a top view of an interposer mounted with multiple PBUs and BPU ICs to realize signal distribution of antenna beam signals.

FIG. 7 illustrates a top view of an interposer 700 mounted with multiple PBUs and BPU ICs to realize signal distribution of antenna beam signals. As depicted in FIG. 7, multiple BPUs and BPU ICs 710, which also contains the first layer of signal divider and distribution network 740, are mounted on the interposer 700, which comprises a second layer of the signal divider and distribution network 720 for interconnection of antenna beam signals, e.g., for distributing multiple input signals to the VAPs on the multiple BPUs and BPU ICs that are mounted on interposer 700. For example, interposer 700 comprises 16 antenna feeds 730 and four input signal feeds 1-4. The 16 antenna feeds 730 take output signals from BPU outputs to corresponding antenna elements on an antenna substrate (e.g., antenna substrate 610 in FIG. 6). The four input signal feeds 1-4 take input signals from the third layer signal divider and distribution network, which distributes input signals of four beams (e.g., Beam1-Beam4 in FIG. 6), and each input signal is distributed to 16 VAPs on the BPU ICs via the second layer 720 and the first layer 740 of the signal divider and distribution network. After BPU frontend signal processing, the different processed beam signals are summed and output to a corresponding antenna on the antenna substrate for transmission.

Figure 8:
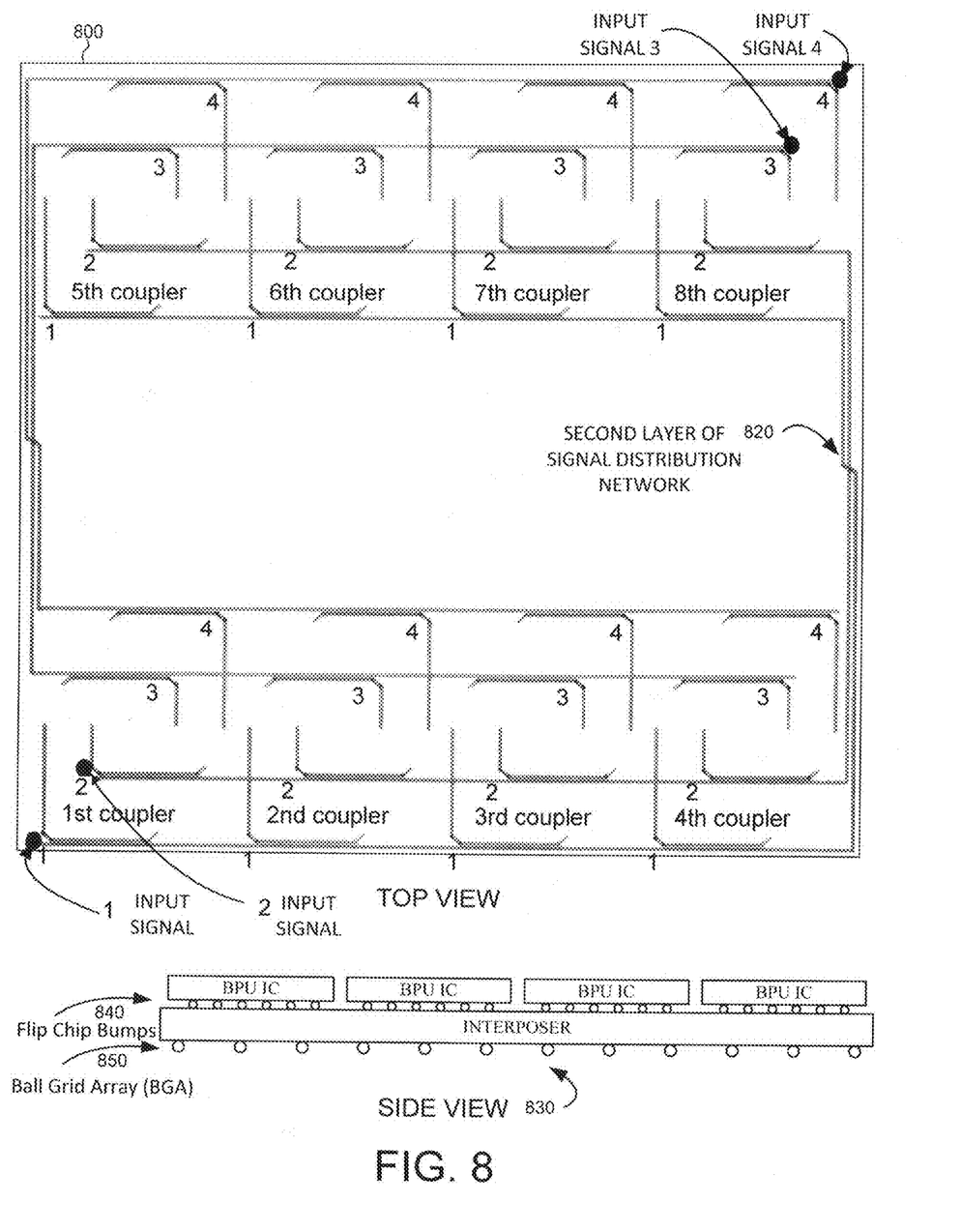
FIG. 8 illustrates a top view of an interposer having a second layer of the signal distribution network with serial feeds.

FIG. 8 illustrates a top view of an interposer 800 having a second layer of the signal distribution network with serial feeds. As illustrated, interposer 800 comprises four input signal feeds 1-4 and a second layer of the signal distribution network 820. The four input signal feeds 1-4 take input signals from the third layer of signal divider and distribution network, and each beam signal is distributed to 16 VAPs on the BPU ICs via the first layer distribution network. One preferred embodiment for the second layer of the signal distribution network is formed by transmission lines with serial coupler feeds. The serial couplers along the transmission line, performs the function of the divider. Accounting for the signal loss due to the transmission line, the coupling ratios of the 8 different couplers along the transmission line progressively increases, from the $1^{st}$ coupler to the $8^{th}$ coupler. Note that as the signal power is coupled off the transmission line from the couples, resulting in progressive lower signal level along the transmission line, larger coupling ratios are needed to provide the same power level for the divided output signals. Note that the first layer divide-by-two is in the BPU as shown in FIG. 7. As compared to the conventional divider network such as Wilkinson divider, the serial coupler is easier to realize since the signal routing along the regular grid of antenna element feeds is more straightforward as compared to the multiple level the corporate divider network employing binary dividers.

FIG. 8 further shows the sideview 830 of the interposer substrate with BPU ICs mounted. The preferred embodiment attaches the BPU flip-chip to the top of the interposer substrate. The BPU IC with flip-chip bumps 840 are commercially available in the backend processing of IC fabrication. It is a mature, reliable, and low-cost process for mass production. The preferred embodiment is to attach the interposer to the antenna substrate using the ball-grid array (BGA) 850 which is also a mature, reliable, and low-cost process for mass production. Note that the BPU ICs can also be attached to the bottom side of the interposer, which imposes some restrictions on the positions of the BGA placement.

Figure 9:
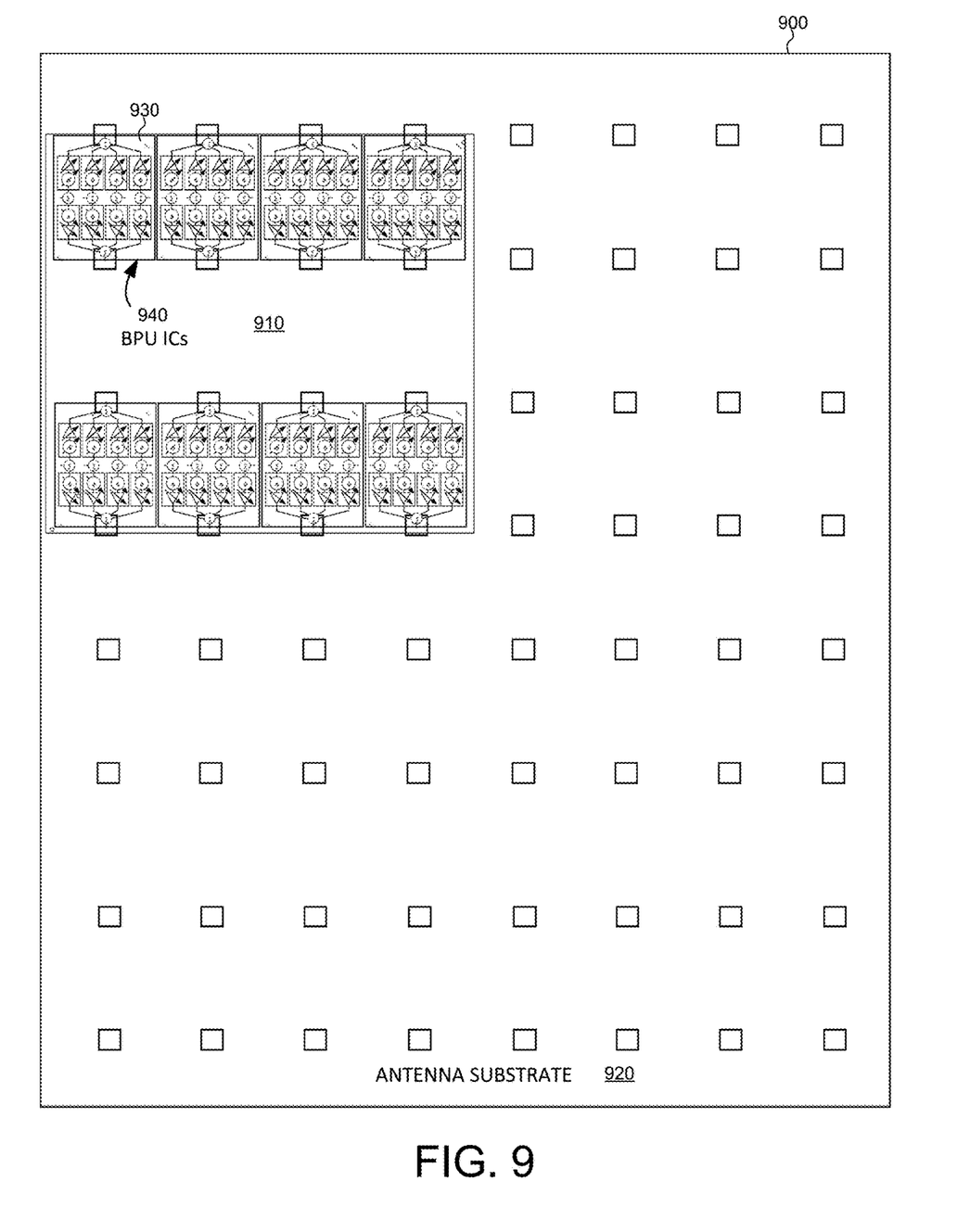
FIG. 9 illustrates a top view of a multi-beam phased-array antenna with an antenna substrate containing multiple interposers in accordance with one novel aspect of the present invention.

FIG. 9 illustrates a top view of a multi-beam phased-array antenna aperture 900 with an antenna substrate containing multiple interposers in accordance with one novel aspect of the present invention. In the example of FIG. 9, interposer substrate 910 is stacked on top of the antenna substrate 920. Interposer substrate 910 comprises one of the multiple couplers (divider) 930, which provides the second layer of the signal divider and distribution network. In a preferred embodiment, the BPU ICs 940 are flip chip mounted onto the interposer substrate.

Figure 10:
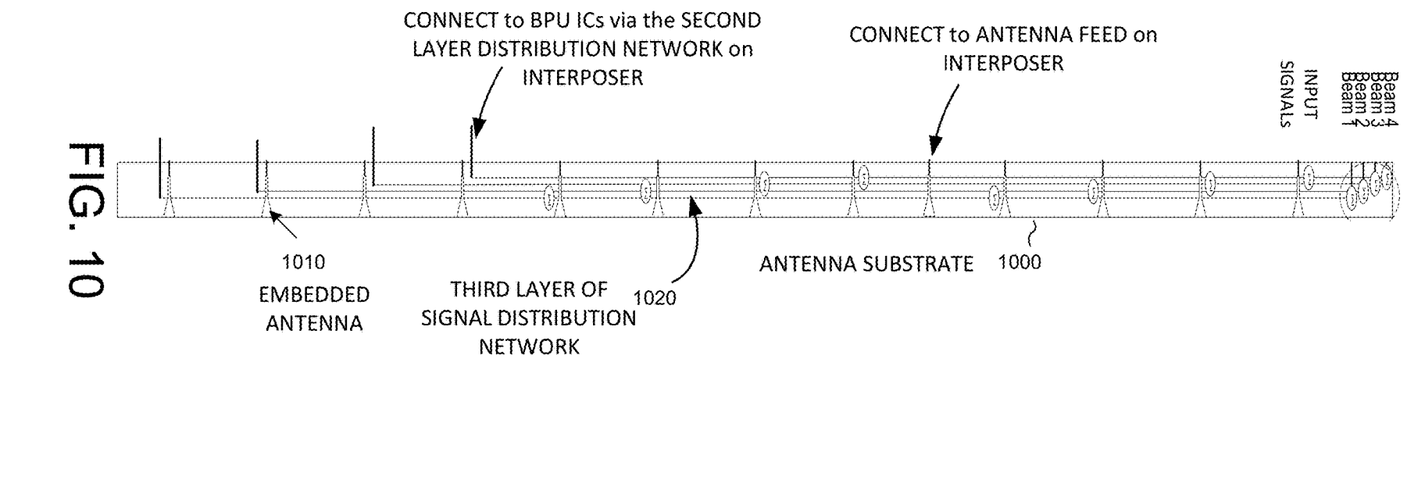
FIG. 10 illustrates an antenna substrate comprising a third layer signal distribution network with antenna on same substrate.

FIG. 10 illustrates an antenna substrate 1000 comprising a third layer signal divider and distribution network with embedded antenna elements on the same substrate. As illustrated in FIG. 10, the antenna substrate 1000 is embedded with a plurality of antenna elements 1010. In addition, the antenna substrate 1000 provides a third layer of the signal divider and distribution network 1020 that interconnects the input signals (e.g., Beam1-Beam4) with the plurality of the BPU ICs. Note that a second layer of the signal divider and distribution network (e.g., depicted as 820 in FIG. 8) is provided by the interposers that further distribute the input signals (e.g., Beam1-Beam4) to the plurality of BPU ICs. The second and third layers of the signal distribution network can operate at different frequency for good isolation from signal at BRU ICs since any coupled signals can be rejected by the various processing elements which are matched to a different frequency. In one embodiment, serial coupler feeds are preferred to go through the antenna feeds that are positioned in regular grids. In the present invention, the third layer of the signal divider and distribution network is combined with the antenna elements onto the same antenna substrate 1000 to achieve low cost implementation with no connectors.

Figure 11:
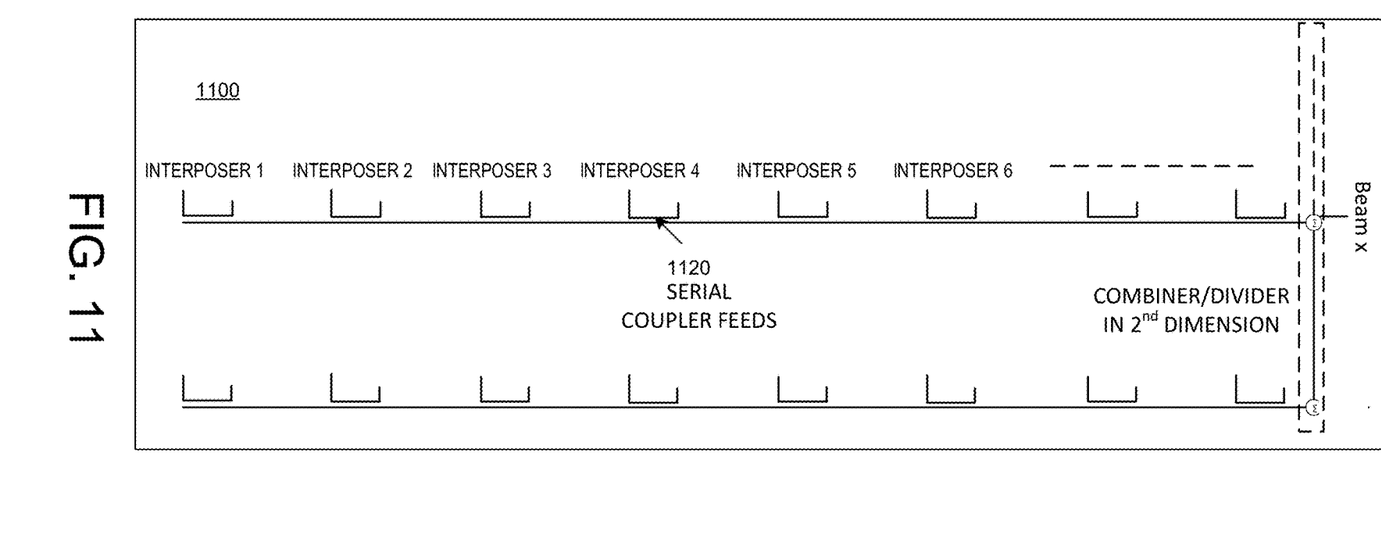
FIG. 11 illustrates a third layer distribution network on an antenna aperture to achieve easier layout and avoid antenna feed grids.

FIG. 11 illustrates a third layer distribution network on an antenna aperture 1100 to achieve easier layout and avoid antenna feed grids. In the example of FIG. 11, antenna aperture 1100 comprises an antenna substate and the embedded third layer of the signal divider and distribution network. The preferred embodiment signal divider and distribution network for a two dimensional phased-array, consisting of a first divider network with multiple couplers connected in series along a transmission line 1120 in the first direction (e.g. along X axis), being limited layer width makes it easier to go through the narrow space in between the regular grid of the antenna feeds, and a second divider network (along the Y axis), on the edge of the antenna substrate slightly extended beyond the grid of the antenna feeds, avoiding the antenna feeds altogether. The novel aspect of the preferred embodiment allows the third layer of the signal divider and distribution network to be embedded within the antenna substrate. Since antenna feed grids are positioned in regular grids, the conventional corporate network employing multi-level of binary Wilkson combiners, in place of serial couplers, will not be easily realized.

Figure 12:
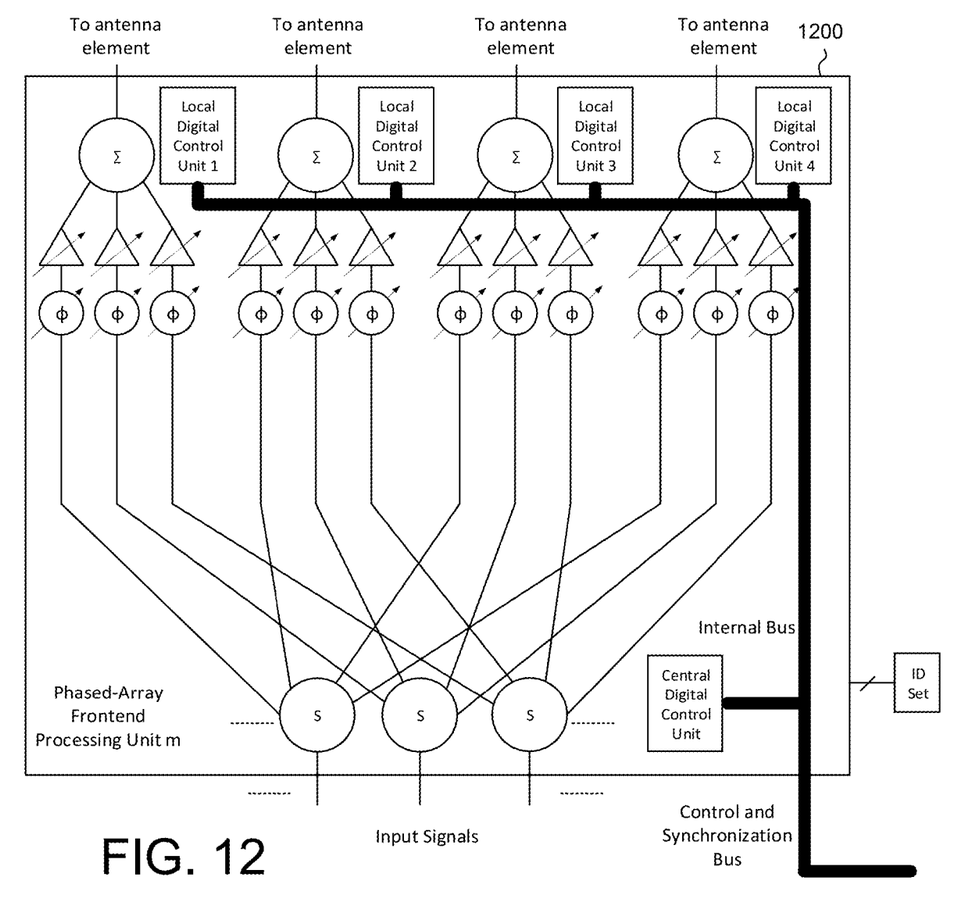
FIG. 12 illustrates a functional diagram of a phased-array frontend processing unit.

FIG. 12 illustrates a functional diagram of a phased-array frontend processing unit 1200, containing the control and synchronization functions. The phased-array frontend processing unit 1200 comprises a plurality of power amplifiers and phase shifters coupled to a signal combiner/divider and distribution network, a plurality of distributed local digital control units, a central digital control unit, and a control and synchronization bus. All analog functions such as phase shifter state, amplifier gain, amplifier bias, global bias generation via bandgap, and on/off control power management are controlled by digital registers and memory in the local digital control units and central digital control unit. Digital registers are controlled (configured or updated) via the control and synchronization bus. Note there can be many phased-array frontend processing units in an antenna array. The generic architecture for digital control of a phased-array antenna operation is applicable to multi-beam phased array antenna sharing same antenna aperture. The novel approach simplifies the signal control and synchronization interconnection via serial bus, supports fast beam direction change via serial bus, independent beam steering for multiple antenna beams.

A unique identifier is provided to each phased-array frontend processing unit by locally setting ID pins to logic high or logic low. The ID setting of each phased-array frontend processing unit is converted into the unique register address for the control and synchronization bus. Control and Synchronization Bus performs the following function: 1) Bi-direction communication of the control and synchronization signals between a host processor and each processing unit (host processor is the bus master and the processing unit is the bus slave), 2) update the antenna weight vectors synchronously in an array for realizing a beam direction change, 3) Update of other functions related to the operational state of the array.

For microwave and mmWave phased-array antenna, the antenna elements are placed close to each other. There is little room available in practical implementation for the signal interconnection. It is desirable to have a serial bus implementation for the Control and Synchronization Bus. For any high-speed digital interconnection, long interconnection wiring/traces require (active) buffers to maintain signal integration and bus speed. It is desirable to keep interconnection as short as possible, and keep the number of signals in the interconnection serial bus as little as possible.

Figure 13:
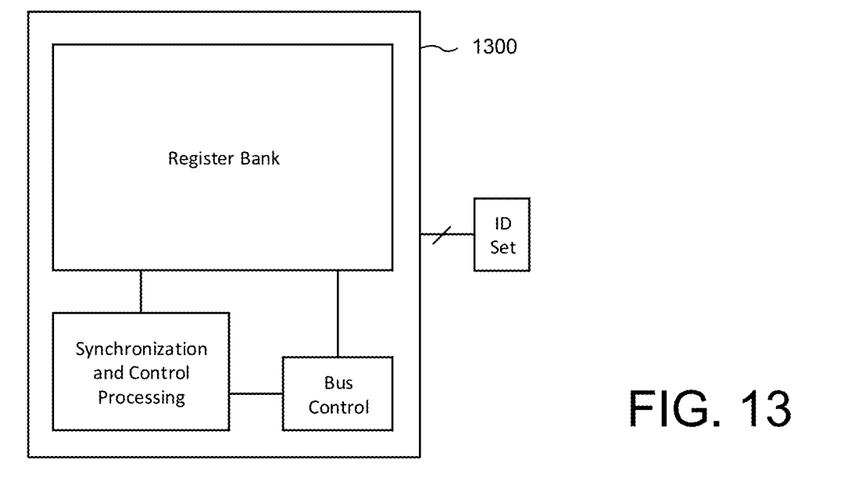
FIG. 13 illustrates a functional diagram of a digital control and synchronization unit on a phased-array frontend processing unit of a phased-array antenna.

FIG. 13 illustrates a functional diagram of a digital control and synchronization unit 1300 on a phased-array frontend processing unit of a phased-array antenna. In a phased-array frontend processing unit, there are two types of digital control unit. A central digital control unit is for control of centralized function such as global bias generation via bandgap and on/off control power management. A local digital control unit is for control of function related to the processing of each individual antenna elements such as phase shifter state, amplifier gain, and amplifier bias adjustments. Note that whether a circuit is controlled by the central digital control unit and the local digital control unit is primarily based on the proximity of the circuit to which the digital control unit for simplifying the signal interconnection. Each digital control unit provides the following functions: 1) Bus access control: operates in a slave mode of a serial bus. Processing register write/read, address decoding, and error checking, and 2) Synchronizing an update of antenna weight vectors in all antenna elements in the array during the beam direction change. The following mode of bus operations are supported. For Unicast operation, host processing accesses (write to or read from) individual register within the array based on the following: 1) ID setting of the Phased-Array Frontend Processing Unit, and 2) Register address within the Phased-Array Frontend Processing Unit. Note that all the local digital control unit are identical design and the addresses of the registers in a local digital control unit are set according to the ID setting of the local digital control unit. For Multicast operation, host processing writes identical value to all phased-array frontend processing units. No multicast read operation is allowed.

Antenna Weight Vectors are stored in the local digital control units. To avoid writing new set of antenna weight vectors to all antenna elements every time antenna beam direction changes, a set of antenna weight vectors are stored in register AWV table. For each of the N antenna element, there are K antenna weight table (one for each of the K antenna beams). For each antenna beam, the corresponding AWV Pointer indicates which antenna weight vector within the AWV table is active. The AWV pointers in different phased-array frontend processing units corresponding to each beam shall have the same AWV Pointer value. To achieve a simultaneous update of the corresponding AWV pointers in different phased-array frontend processing units for beam k to a new value (new antenna beam direction), a multicast write operation to all the phased-array processing units.

There are two types of registers with the phased-array antenna. Common register: replicate registers in all local digital control units, and central digital control unit. All replicated register has the same register address, the register in the central digital control unit is designated as the read back register. Regular register: each register has unique register address, no duplication. To achieve synchronization, the AWV Pointer registers within a phased-array frontend processing unit corresponding to different antenna elements are implemented as common register (thus replicated in each antenna element). Each digital control unit identifies all memory/register elements in the digital circuits and implement majority voting logic decoder by replicate registers and separate them in physical layout location and employs majority voting.

In a harsh environment such as the outer space, where sensitive electronic circuits are subject to occasional heavy ion bombardments, different types of erroneous events can occur: 1) SEL (single event latch-up): analog circuit cell a or digital circuit cell are held up in the erroneous non-functional state. The SEL generally requires a power cycle to recover. The work around is to employ silicon process which is not susceptible to such attack or alternately, employ robust layout in the circuits to avoid the latch up. For example, the robust design layout can be first to establish a digital cell library containing basic functions, and RTL design and synthesis employs such robust library to form the resultant circuit; 2) SEU or SEFI (Single event upset, Single even functional interrupts): causes the change the state of a storage element (flip-flop, latch, memory), upsets control circuits, such as state machines, placing the device into an undefined state, a test mode, or a halt; 3) SET (Single event transient): causes a temporary voltage glitch in combinatoric logic or analog circuit due to excessive charge deposited on a node, recovers from errors autonomously once effects induced by ION impact dies off.

Figure 14:
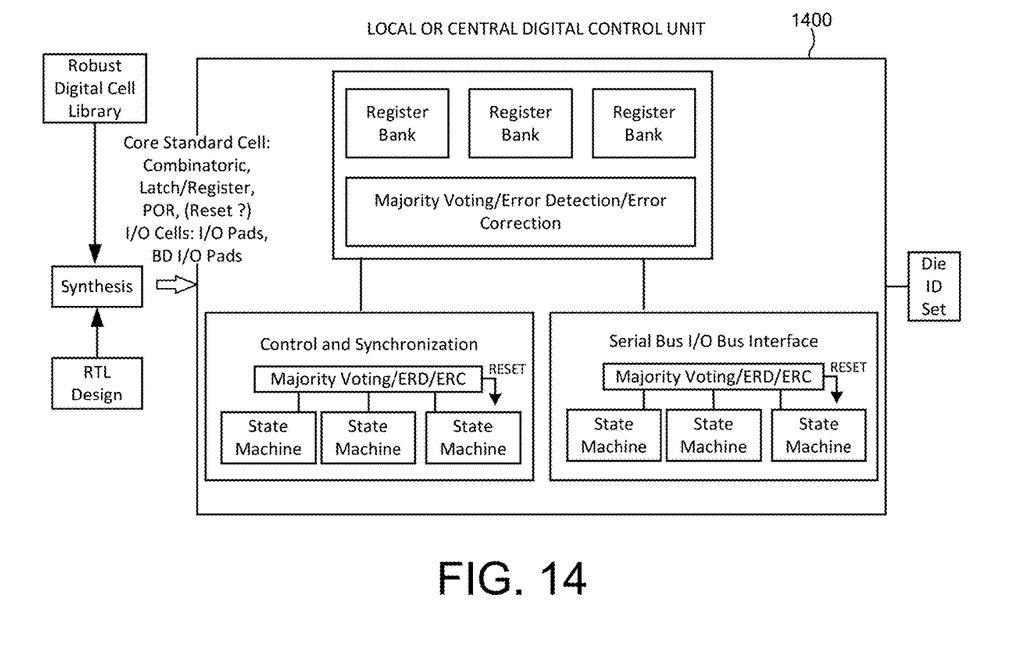
FIG. 14 illustrates a functional diagram of a robust digital control and synchronization unit employs majority voting rules for digital design containing the storage cells such as state machine or register.

FIG. 14 illustrates a functional diagram of a robust digital control and synchronization unit 1400 employs majority voting rules for digital design containing the storage cells such as state machine or register. The preferred embodiment applies a robust design that can handle harsh environment. First two type of digital circuits are identified: memoryless logic circuits and storage element circuits such as state machine and registers. In general, the memoryless logic circuits can sustain a SET and recover. The storage element circuits require resetting to recover. The preferred embodiment first partitions the serial bus interface and the control and synchronization block into memoryless and state-machines. The state-machines are replicated in multiple copies and a majority voting logic is implemented that provides a correct output even if the state-machine(s) is in error. The error correction or error detection is used to generate a reset to the erroneous state machine(s). Additionally, the register blocks are replicated in in multiple copies and a majority voting logic is implemented that provides a correct output in the erroneous event to a copy or the minority of the copies. The error correction or error detection can set a flag to the host controller which can reload the content of the erroneous register block(s). The novel aspect of the proposed invention enhances the reliability against SET or SEFI without significantly complicating the overall phased-array design.

Figure 15:
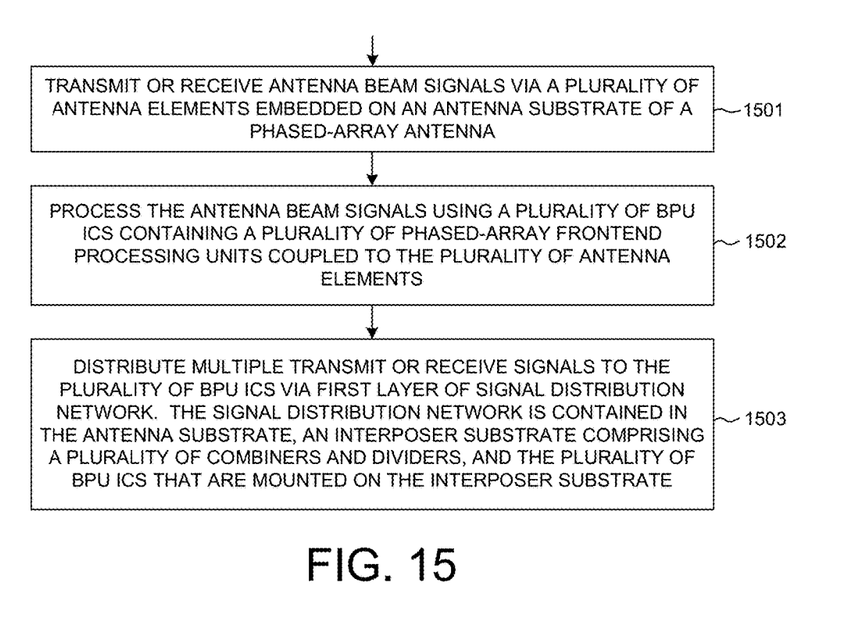
FIG. 15 is a flow chart of a method of signal distribution of multiple antenna beams on an antenna substrate of a multi-beam phased-array antenna in accordance with one novel aspect.

FIG. 15 is a flow chart of a method of signal distribution of multiple antenna beams on an antenna substrate of a multi-beam phased-array antenna in accordance with one novel aspect. In step 1501, a multi-beam phased-array antenna transmits or receives antenna beam signals via a plurality of antenna elements embedded on an antenna substrate of a phased-array antenna. In step 1502, the antenna processes the antenna beam signals using a plurality of BPU integrated circuits (ICs) containing a plurality of phased-array frontend processing units coupled to the plurality of antenna elements. In step 1503, the antenna distributes multiple transmit or receive signals to the plurality of BPU ICs via three layers of a signal combiner/divider and distribution network. The signal combiner/divider and distribution network is contained in the antenna substrate having a third layer, an interposer substrate comprising a plurality of combiners and dividers having a second layer, and the plurality of BPU ICs that are mounted on the interposer substrate having a first layer. The antenna also contains a control and synchronization system implemented with serial bus and with redundancy to withstand harsh operating environment.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A multi-beam phased-array antenna, comprising:
a plurality of beamforming processing unit (BPU) integrated circuits (ICs) that comprises a plurality of phased-array frontend processing units coupled to a plurality of antenna elements and a first layer of a combiner/divider and distribution network;
a plurality of interposers having a corresponding interposer substrate, wherein the plurality of BPU ICs are mounted on the interposer substrate, and wherein a second layer of the combiner/divider and distribution network having a plurality of combiners and dividers is embedded on the interposer substrate; and
an antenna substrate embedded with a plurality of antenna elements for transmitting and receiving antenna beam signals, wherein the antenna substrate comprises a third layer of the combiner/divider and distribution network for distributing multiple transmit or receive signals to the plurality of BPU ICs together with the first layer and the second layer.

2. The antenna of claim 1, wherein the antenna is a multi-beam phased-array antenna that simultaneously processes the multiple transmit or receive signals to be transmitted or received as the antenna beam signals having different beam directions.

3. The antenna of claim 2, wherein each BPU contains a plurality of variable amplitude and phase adjustment (VAP) chain, wherein each VAP chain processes a corresponding antenna beam signal, and wherein outputs from the plurality of VAPs for the antenna-beam signals are summed before coupling to an antenna element.

4. The antenna of claim 1, wherein the antenna beam signals are coupled to up/down converters for converting the multiple transmit or receive signals with a local oscillator signal.

5. The antenna of claim 1, wherein the signal combiner/divider and distribution network operate at a different frequency from the plurality of phased-array frontend processing units for isolation.

6. The antenna of claim 1, wherein the antenna substrate further comprises serial couplers for providing the third layer of the signal combiner/divider and distribution network that interconnects the multiple transmit or receive signals with the plurality of BPU ICs.

7. The antenna of claim 6, wherein the third layer of combiner/divider and distribution network and the plurality of the antenna elements are embedded on the same antenna substrate to achieve low cost implementation without connectors.

8. The antenna of claim 1, wherein the plurality of phased-array frontend processing units is controlled by digital control units via a control and synchronization bus.

9. The antenna of claim 8, wherein each of the digital control units comprises a register bank, a control and synchronization processor, and a bus control for unicast and broadcast operation.

10. The antenna of claim 9, wherein the digital control units adopt a majority voting logic and a detection and recovery scheme for replicated circuits containing storage cells to guard against transient erroneous events due to external disturbances.

11. A method, comprising:
transmitting or receiving antenna beam signals via a plurality of antenna elements embedded on an antenna substrate of a phased-array antenna;
processing the antenna beam signals using a plurality of beamforming processing unit (BPU) integrated circuits (ICs) containing a plurality of phased-array frontend processing units coupled to the plurality of antenna elements; and
distributing multiple transmit or receive signals to the plurality of BPU ICs via three layers of a signal combiner/divider and distribution network, wherein the signal combiner/divider and distribution network is contained in the antenna substrate having a third layer, an interposer substrate comprising a plurality of combiners and dividers having a second layer, and the plurality of BPU ICs that are mounted on the interposer substrate having a first layer.

12. The method of claim 11, wherein the antenna is a multi-beam phased-array antenna that simultaneously processes the multiple transmit or receive signals to be transmitted or received as the antenna beam signals having different beam directions.

13. The method of claim 12, wherein each BPU contains a plurality of variable amplitude and phase adjustment (VAP) chain, wherein each VAP chain processes a corresponding antenna beam signal, and wherein outputs from the plurality of VAPs for the antenna-beam signals are summed before coupling to an antenna element.

14. The method of claim 11, wherein the antenna beam signals are coupled to up/down converters for converting the multiple transmit or receive signals with a local oscillator signal.

15. The method of claim 11, wherein the signal combiner/divider and distribution network operate at a different frequency from the plurality of phased-array frontend processing units for isolation.

16. The method of claim 11, wherein the antenna substrate further comprises serial couplers for providing a third layer of the signal combiner/divider and distribution network that interconnects the multiple transmit or receive signals with the plurality of BPU ICs.

17. The method of claim 16, wherein the third layer of combiner/divider and distribution network and the plurality of the antenna elements are embedded on the same antenna substrate to achieve low cost implementation without connectors.

18. The method of claim 11, wherein the plurality of phased-array frontend processing units is controlled by digital control units via a control and synchronization bus.

19. The method of claim 18, wherein each of the digital control units comprises a register bank, a control and synchronization processor, and a bus control for unicast and broadcast operation.

20. The method of claim 19, wherein the digital control units adopt a majority voting logic and a detection and recovery scheme for replicated circuits containing storage cells to guard against transient erroneous events due to external disturbances.

\* \* \* \* \*